(12) United States Patent
Donati

(10) Patent No.: US 12,330,834 B2
(45) Date of Patent: Jun. 17, 2025

(54) MACHINE AND METHOD FOR PACKAGING IN A STERILE ENVIRONMENT A PRODUCT INTO FLEXIBLE PACKAGES

(71) Applicant: UNIVERSAL PACK S.R.L., San Giovanni in Marignano (IT)

(72) Inventor: Pietro Donati, San Giovanni in Marignano (IT)

(73) Assignee: UNIVERSAL PACK S.R.L., San Giovanni in Marignano (IT)

( * ) Notice: Subject to any disclaimer, the term of this patent is extended or adjusted under 35 U.S.C. 154(b) by 0 days.

(21) Appl. No.: 18/218,768

(22) Filed: Jul. 6, 2023

(65) Prior Publication Data

US 2024/0010371 A1  Jan. 11, 2024

(30) Foreign Application Priority Data

Jul. 6, 2022  (IT) .................. 102022000014335

(51) Int. Cl.
 *B65B 9/04* (2006.01)
 *B65B 9/15* (2006.01)
 (Continued)

(52) U.S. Cl.
 CPC .............. *B65B 9/15* (2013.01); *B65B 9/04* (2013.01); *B65B 51/28* (2013.01); *B65B 55/103* (2013.01); *B65B 61/06* (2013.01)

(58) Field of Classification Search
 CPC ....... B65B 9/042; B65B 31/045; B65B 61/04; B65B 61/06
 (Continued)

(56) References Cited

U.S. PATENT DOCUMENTS

| 4,099,914 A * | 7/1978 | Gustafsson ........... B65B 55/103 |
| | | 53/167 |
| 4,557,377 A * | 12/1985 | Maloney ............... B65D 31/12 |
| | | 383/44 |

(Continued)

FOREIGN PATENT DOCUMENTS

| JP | 2005-138844 A | 6/2005 |
| WO | 2012/048837 A1 | 4/2012 |
| WO | 2022/024155 A1 | 2/2022 |

OTHER PUBLICATIONS

Search Report for Italian Patent Application No. 202200014335 dated Mar. 8, 2023 (2 sheets).

*Primary Examiner* — Thanh K Truong
*Assistant Examiner* — Patrick B Fry
(74) *Attorney, Agent, or Firm* — Kratz, Quintos & Hanson, LLP

(57) ABSTRACT

A machine for packaging a product into flexible packages and which comprises one or more forming and filling units for forming and filling the packages; each forming and filling unit extends along a longitudinal axis and comprises at least one nozzle, feed means configured to make advance along the longitudinal axis a tubular casing of the material with which to make the packages and having an internal surface facing the nozzle, first longitudinal welding means for joining together at least two sides of the tubular casing and second longitudinal welding means, disposed downstream of said first longitudinal welding means, and configured to join together at least two portions of the internal surface of the tubular casing in a marginal end volume.

12 Claims, 3 Drawing Sheets

(51) Int. Cl.
*B65B 31/04* (2006.01)
*B65B 51/26* (2006.01)
*B65B 51/28* (2006.01)
*B65B 55/10* (2006.01)
*B65B 61/04* (2006.01)
*B65B 61/06* (2006.01)

(58) Field of Classification Search
USPC .................................. 53/426, 450, 451, 554
See application file for complete search history.

(56) References Cited

U.S. PATENT DOCUMENTS

| | | | | |
|---|---|---|---|---|
| 4,769,974 | A * | 9/1988 | Davis | ................ B65B 9/023 |
| | | | | 53/511 |
| 5,417,035 | A | 5/1995 | English | |
| 6,035,614 | A * | 3/2000 | Gustafsson | ........... B65B 31/045 |
| | | | | 53/551 |
| 6,212,861 | B1 | 4/2001 | Tsuruta | |
| 6,622,459 | B1 * | 9/2003 | Sarria Sanchez | ..... B65B 9/2028 |
| | | | | 53/551 |
| 7,958,697 | B2 * | 6/2011 | Rapparini | ............. B65B 55/106 |
| | | | | 53/511 |
| 11,089,815 | B2 * | 8/2021 | Persson | .................. B65B 51/26 |
| 2001/0036496 | A1 | 11/2001 | Recchia, Jr. | |
| 2008/0141620 | A1 * | 6/2008 | Szabo | .............. B29C 66/83411 |
| | | | | 206/522 |

* cited by examiner

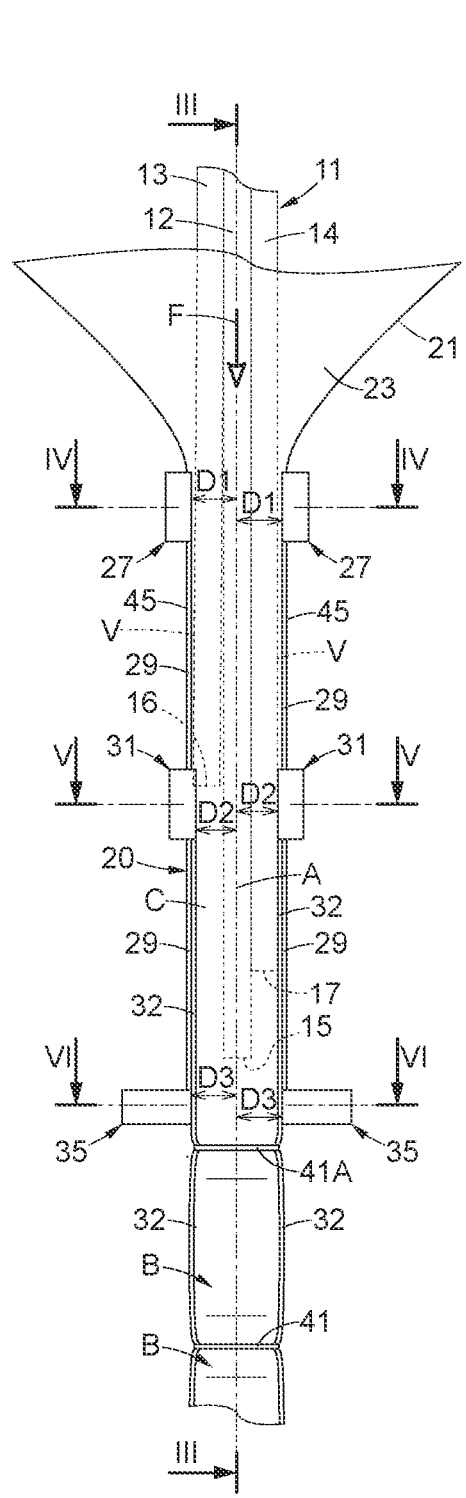
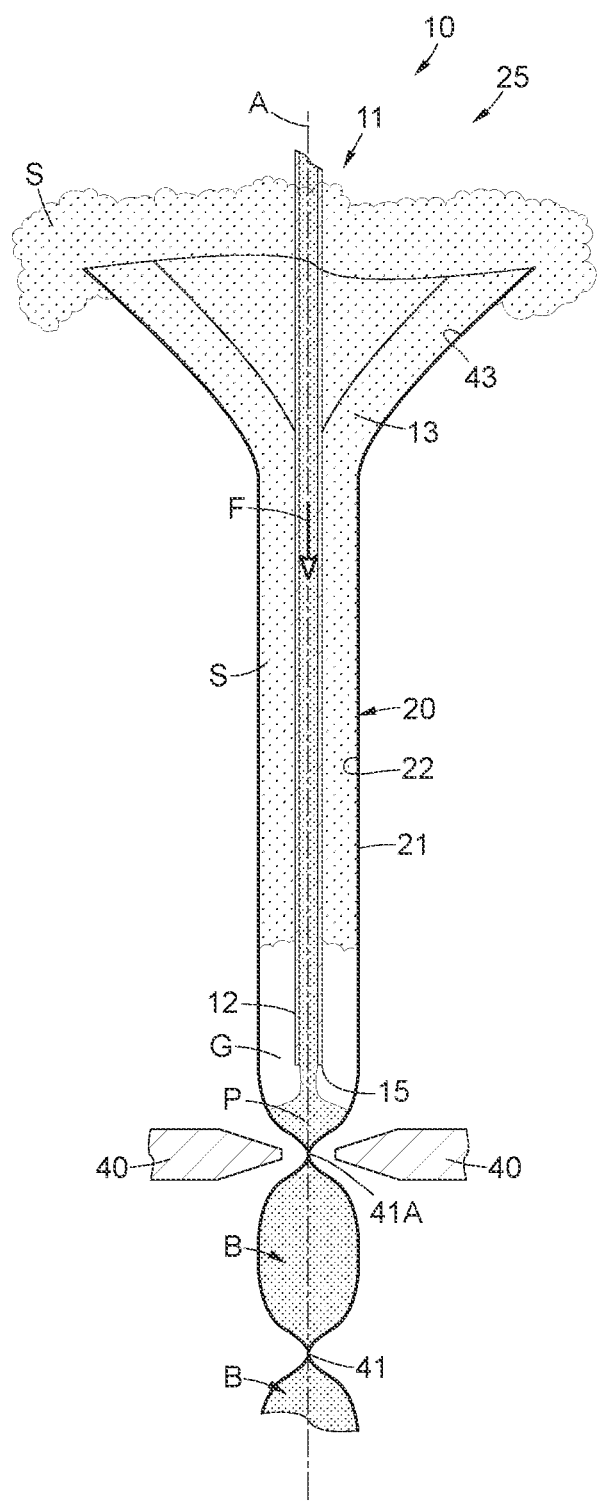
fig. 2
fig. 3

MACHINE AND METHOD FOR PACKAGING IN A STERILE ENVIRONMENT A PRODUCT INTO FLEXIBLE PACKAGES

SCOPE OF APPLICATION

The present invention refers to a machine and a method for packaging in a sterile environment a product into flexible packages, such as sachets, pouches or bags, preferably of the single-dose type. The machine and the method according to the present invention are suitable for packaging, by way of example and without limitation to generality, products in the liquid, semi-liquid or pasty state, such as oil, milk, sauces, creams, pomades, or solid products, for example in powder or in granules.

BACKGROUND OF THE INVENTION

Machines for packaging a product into flexible packages also known as "form-fill-seal" machines are known. In such machines there is usually a nozzle for the delivery of the product to be packaged, typically in liquid, pasty or granular form, and one or more welding units to longitudinally and transversely weld the formed and filled package. In some cases, where it is provided for a longitudinal flap distant from the longitudinal lateral edges of the package, it is provided for an additional welding unit for the correct welding of said flap. Examples of such machines are described in prior patent documents U.S. Pat. No. 5,417,035 and JP2005138837.

For some types of products, it is necessary that the packaging occurs in a sterile environment. For this purpose machines have been developed for packaging a product into flexible packages in a sterile environment which generally comprise a nozzle around which one or more sheets of plastic material—typically two—are fed, along a feeding direction, which will be joined to form the flexible packages.

An example of a machine under discussion is described in the International Patent Application WO2022/024155 in the name of the Applicant.

The nozzle comprises a duct for the delivery of the product to be packaged, a further duct for the delivery of a sterilizing gas, and another duct to deliver a purging gas able to prevent the product from coming into contact with the sterilizing gas used to sterilize the inside of the flexible packages.

Upstream of the outlet holes of the aforementioned ducts there is disposed a longitudinal welding device having the function of longitudinally welding the sheets made of plastic material and of defining a tubular casing that wraps the nozzle, while downstream of the outlet holes of the ducts there is disposed a transverse welding device having the function of transversely welding the sheet and of defining the flexible packages.

Normally, the longitudinal welding is performed continuously while feeding the sheets around the nozzle, so as to ensure that the tubular casing, that is the precursor of the flexible packages, delimits the environment that is to be sterilized.

The transverse welding is performed intermittently to allow the sheets of plastic material to move away from the product delivery hole, between one transverse welding and the other, so as to make a package having a predetermined length.

A drawback of the known delivery units consists in the fact that the zone covered by the longitudinal welds is not decontaminated and, therefore, any defects in the realization of such welds expose parts that are not decontaminated towards the inside of the package, i.e. directly in contact with the product.

There is therefore a need to perfect a machine and method for packaging a product in a sterile environment into flexible packages, which can overcome at least one of the disadvantages of the state of the art.

To do this it is necessary to solve the technical problem of avoiding that parts that have not been decontaminated are in direct contact with the product contained inside the packages.

In particular, a purpose of the present invention is to realize a machine and method for packaging in a sterile environment a product that guarantees the perfect sterilization of the package even in the presence of defects in the longitudinal welds.

Another purpose of the present invention is to realize a machine, and to develop a method, for packaging a product in a sterile environment that are simple both structurally and functionally, and inexpensive to make and implement.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, and to resolve the technical problem disclosed above in a new and original way, also achieving considerable advantages compared to the state of the prior art, a machine according to the present invention for packaging in a sterile environment a product into flexible packages, and which comprises one or more units for forming and filling such packages.

Each of said forming and filling units extends along a longitudinal axis and comprises:
  at least one nozzle provided with a first duct configured to deliver said product and a second duct configured to deliver a sterilizing agent,
  feed means configured to make one or more sheets advance along a direction of advance parallel to said longitudinal axis, one or more sheets defining a tubular casing around said nozzle, which has an internal surface facing said nozzle and delimiting a semi-closed chamber,
  first longitudinal welding means configured to form at least a first longitudinal weld that joins said sheets at a respective longitudinal edge of the package.

In accordance with one aspect of the present invention, the machine comprises second longitudinal welding means, disposed downstream of said first longitudinal welding means with reference to said direction of advance, to make at least a second longitudinal welding that joins together at least two portions of said internal surface wherein the position of said second longitudinal welding means is such as to ensure that said second longitudinal welding is made at a respective marginal end volume of said semi-closed chamber adjacent to said first longitudinal welding, so as to be closer to the longitudinal axis with respect to the latter.

Thanks to the second longitudinal welding means it is possible to make the aforesaid second longitudinal weld which defines a safe barrier between the product contained in the package and the aforesaid first longitudinal weld. In this way it is possible to avoid, or significantly reduce, the risk of placing non-decontaminated parts of the package, such as for example the first longitudinal weld, directly in communication with the product contained within the package itself.

Tests and trials carried out by the Applicant have shown that, in case where parts contaminated by germs or bacteria remain in the package, these parts are placed in such marginal end volume, which is the most difficult to completely and effectively decontaminate, because of both its distance from the longitudinal axis and its tapered shape.

Thanks to the arrangement of the second welding means it is therefore possible to make a second weld at said marginal end volume, thus incorporating into the longitudinal edge parts that have not possibly been completely and effectively decontaminated, so that said parts no longer face said semi-closed chamber, and therefore are no longer exposed to the product with which said packages are filled.

In accordance with another aspect of the present invention, said first longitudinal welding means are disposed at a first minimum distance from said longitudinal axis which is greater than a second minimum distance at which said second longitudinal welding means are positioned with respect to said longitudinal axis.

In accordance with another aspect of the present invention, the machine also comprises cutting means disposed downstream of said second longitudinal welding means with reference to the direction of advance and configured at least to perforate said tubular casing at said marginal end volume, in an intermediate position between said first and said second longitudinal weld.

In accordance with another aspect of the present invention, said cutting means are disposed at a third minimum distance from said longitudinal axis which is comprised between the first minimum distance between said first longitudinal welding means and said longitudinal axis and the second minimum distance between said second longitudinal welding means and said longitudinal axis.

In accordance with another aspect of the present invention, said first and said second ducts have respective delivery outlets and said second longitudinal welding means are disposed in proximity to said delivery outlet of said second duct, approximately at the same height as said delivery outlet.

In accordance with another aspect of the present invention, said delivery outlet of said second duct and said second longitudinal welding means are disposed upstream of said delivery outlet of said first duct with reference to said direction of advance.

In accordance with another aspect of the present invention, said nozzle also comprises a third duct configured to deliver at least one sterile gas and having a delivery outlet positioned downstream of the delivery outlet of said second duct and upstream of the delivery outlet of said first duct.

In accordance with a further aspect of the present invention, a method for packaging in a sterile environment a product into flexible packages comprises at least:
- a feed step in which a tubular casing, made of a material suitable to produce said packages, having an internal surface facing said nozzle and delimiting a semi-closed chamber, is made to advance with respect to the nozzle and along the longitudinal axis;
- a first longitudinal welding step in which said tubular casing is welded along at least one longitudinal side thereof to create at least a first longitudinal weld at a respective longitudinal edge of said package;
- a sterilization step in which a second duct comprised in said nozzle delivers a sterilizing agent inside said tubular casing;
- a second longitudinal welding step in which at least two portions of said internal surface are joined together to make at least one second longitudinal weld wherein the position of said second longitudinal welding means is such as to ensure that said second longitudinal weld is made at a respective marginal end volume of said semi-closed chamber adjacent to said first longitudinal weld so as to be closer to said longitudinal axis with respect to the latter.

In accordance with another aspect of the present invention, said sterilization step occurs after said first longitudinal welding step and prior to said second longitudinal welding step.

In accordance with another aspect of the present invention, the method also comprises a cutting step in which said tubular casing is at least perforated at said marginal end volume, in a zone comprised between said first longitudinal weld and said second longitudinal weld.

In accordance with another aspect of the present invention, the method also comprises a transverse welding step in which transverse welding means perform a transverse weld able to close a respective one of said packages at the bottom and a filling step in which said first duct delivers said product inside said tubular casing, wherein said filling step occurs after with respect to said second longitudinal welding step and to said transverse welding step.

DESCRIPTION OF THE DRAWINGS

These and other aspects, characteristics and advantages of the present invention will become apparent from the following description of some embodiments, given as a non-restrictive example with reference to the attached drawings wherein:

FIG. 2 is a schematic view of a part of the machine of FIG. 1;

FIG. 3 is a section of FIG. 2 in accordance with section plan III-III;

Figure 1:
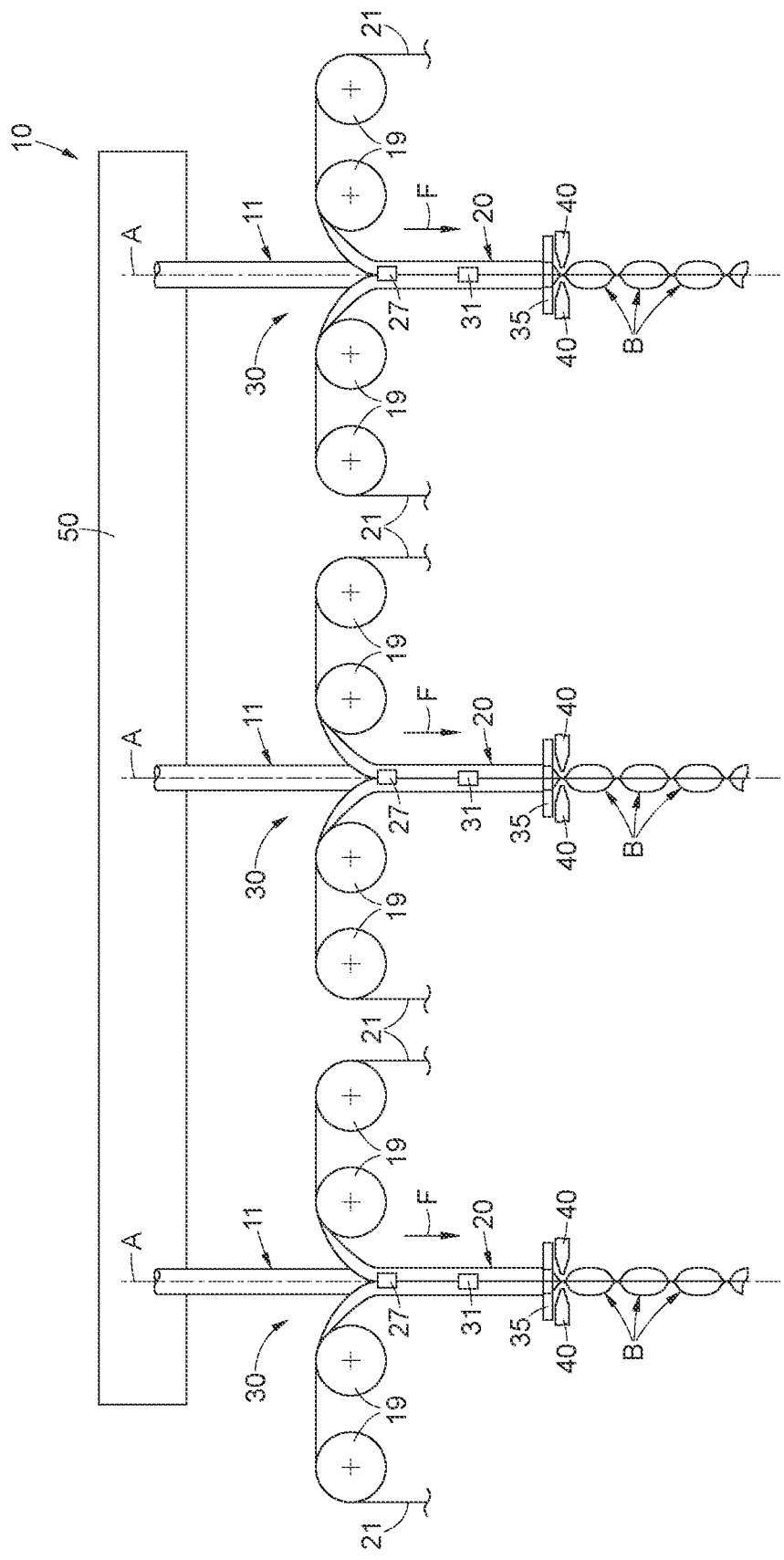
FIG. 1 is a schematic representation of a machine for packaging a product into aseptic flexible packages, in accordance with an embodiment of the present invention.

We must clarify that in the present description the phraseology and terminology used, as well as the figures in the attached drawings also as described, have the sole function of better illustrating and explaining the present invention, their function being to provide a non-limiting example of the invention itself, since the scope of protection is defined by the claims.

To facilitate comprehension, the same reference numbers have been used, where possible, to identify identical common elements in the drawings. It is understood that elements and characteristics of one embodiment can be conveniently combined or incorporated into other embodiments without further clarifications.

DESCRIPTION OF SOME EMBODIMENTS OF THE PRESENT INVENTION

With reference to FIG. 1, a machine 10 according to the present invention, for packaging a product P into flexible packages B, comprises one or more units for forming and filling the packages B, each unit being indicated as a whole with the reference number 30. The flexible packages B can be configured as sachets, pouches, bags or single-dose sticks.

In the example provided in FIG. 1, the machine 10 comprises three units 30 for forming and filling the packages B, all preferably connected to the fixed structure of the machine 10, schematically indicated in FIG. 1 with the reference number 50.

Each unit 30 for forming and filling the packages B develops along a substantially vertical longitudinal axis A and comprises at least one nozzle 11.

The person skilled in the art readily understands that the longitudinal axis A may have a different orientation than represented herein, for example it can be inclined with respect to a vertical plane. Furthermore, the longitudinal axis A may have a development also different from the straight one, for example it may be defined by a combination of straight and/or curved sections.

In the example provided herein the longitudinal axis A may also coincide with the longitudinal axis of symmetry of the nozzle 11, but it is evident that the present invention is not limited thereto. In other configurations, not shown, the longitudinal axis A along which each forming and filling unit 30 develops may not be the axis of the nozzle 11.

The nozzle 11 comprises a first duct 12 able to deliver the product P with which the flexible packages B are filled and a second duct 13 able to deliver a sterilizing agent S.

By way of example only, product P is preferably a liquid, semi-liquid or pasty product comprising oil, milk, sauces, creams, pomades, ointments but the present invention is not limited thereto. The product P may also be a solid product, for example in powder or in granules. Further, by way of example only, the sterilizing agent S may be a gaseous mixture of hydrogen peroxide and air.

The person skilled in the art understands, however, that the product P to be packaged and the sterilizing agent S can be of any other type other than those listed above without thereby departing from the scope of the present invention.

The nozzle 11 may also comprise a third duct 14 configured to deliver at least one sterile gas G such as, for example, sterile air, as will be described in detail below.

Each duct 12, 13, 14 is connected to a respective feed circuit of known type and which will not be described in detail.

Furthermore, each duct 12, 13, 14 has a respective delivery outlet 15, 16, 17. In particular, the first duct 12 has a delivery outlet 15 from which, in use, the product P is delivered, the second duct 13 has a delivery outlet 16 from which, in use, the sterilizing agent is delivered and the third duct 14 has a delivery outlet 17 from which, in use, the sterile gas G is delivered.

In the example provided in FIG. 1, the ducts 12, 13, 14 are positioned substantially vertical, parallel to the longitudinal axis A of the nozzle 11, and the delivery outlets 15, 16, 17 of each duct 12, 13, 14 face downwards.

Furthermore, the delivery outlet 16 of the second duct 13 is disposed upstream of the delivery outlet 15 of the first duct 12 and the delivery outlet 17 of the third duct 14 is positioned downstream of the delivery outlet 16 of the second duct 13 and upstream of the delivery outlet 15 of the first duct 12.

As is clear from FIG. 2, the delivery outlets 15, 16, 17 are disposed at different vertical heights, therefore the expressions "upstream" and "downstream" must be understood with reference to the longitudinal axis A, disposed vertically, as well as to the direction of advance in which the packages B move.

In the embodiments shown herein, the delivery outlets 15, 16, 17 are positioned at the end of the respective duct 12, 13, 14. However, it is clear that in other embodiments the delivery outlets 15, 16, 17 can be positioned at other portions of the respective duct 12, 13, 14, for example comprising one or more holes made at the lateral surface thereof.

The person skilled in the art understands that the reciprocal arrangement between the ducts 12, 13, 14 can be of any type, and can also vary depending on the final shape and the sizes of the packages B to be made.

For example, in the embodiments shown in FIGS. 2 to 5, the ducts 12, 13, 14 of the nozzle 11 are disposed side by side and parallel.

Figure 7:
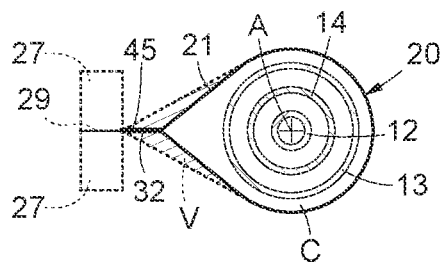
FIGS. 7 and 8 are sectional views of other possible embodiments of the part of FIG. 2.

Alternatively, in the embodiment of FIG. 7, the second duct 13 partially contains the first duct 12 and also the third duct 14. In this case the first, second and third ducts 12, 13, 14 are disposed concentric with each other and with respect to the longitudinal axis A.

In further possible embodiments, two ducts of the nozzle 11 may be disposed concentrically and a third one may be disposed side by side and parallel to them.

Figure 8:
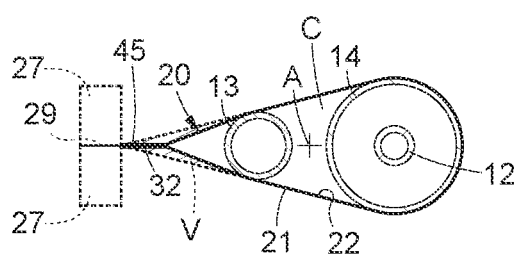

An example of this embodiment is represented in FIG. 8, in which the second duct 13 is side by side and parallel to the first duct 12 and to the third duct 14 which, instead, are concentric.

Each nozzle 11 of the machine 10 is associated with feed means 19 configured to feed at least one sheet 21, for example unwound from a respective reel, around the nozzle 11.

According to one embodiment, the material of the sheet 21 can be formed by one or more layers of a sheet material usually used in the food or pharmaceutical packaging sector, having properties suitable to guarantee hygiene, food compatibility and tightness of the packages B.

Specifically, the feed means 19 are configured to make the at least one sheet 21 around the nozzle 11 advance in a direction of advance, indicated by the arrows F in FIGS. 1-3, parallel to its longitudinal axis A, towards the delivery outlets 15, 16, 17 of the ducts 12, 13, 14.

Starting from the at least one sheet 21, the machine 10 according to the present invention forms a tubular casing 20, in the manner that will be explained in greater detail below. The tubular casing 20 has an internal surface 22 facing the nozzle 11, defining the walls of a semi-closed chamber C in which the product P will be contained, and an external surface 23, opposite the internal surface 22.

In the example provided herein, the feed means 19 are configured as rollers that unwind the one or more sheets 21 in such a way as to form the tubular casing 20 around the nozzle 11.

It should be specified that the conformation and the position of the feed means 19 depend on the shape to be given to the tubular casing 20 and on the number of sheets 21 that are used to make the packages B.

In the example provided herein the tubular casing 20 is formed by two sheets 21 of material coming from opposite parts with respect to the nozzle 11 so that the latter is interposed between the two sheets 21 (FIGS. 1 to 5).

The person skilled in the art understands, however, that the number of sheets 21 and their reciprocal arrangement may also be very different from the one described without thereby departing from the scope of the present invention. For example, the tubular casing 20 may be defined by a single sheet 21 folded on itself (FIGS. 7 and 8).

Each nozzle 11 is also associated with first longitudinal welding means 27 (FIGS. 1, 2 and 4) configured to longitudinally weld the two sheets 21 so as to join them along first longitudinal welds 29, substantially continuous, which, by joining the sheets 21, allow the tubular casing 20 to be formed. This allows the tubular casing 20 to be formed and stabilized around the nozzle 11 to make the sterilizing action of the sterilizing agent S on the internal surface 22 of the tubular casing 20 more effective thanks to the fact of creating said semi-closed chamber C around the nozzle 11, as will be explained in greater detail below.

Also in this case the conformation and the position of the first longitudinal welding means 27 depend on the final shape to be given to the tubular casing 20 and on the number of sheets 21 that are used to make the packages B.

For example, in the example provided herein, in which the tubular casing 20 is defined by two sheets 21 facing each other, the first longitudinal welding means 27 comprise two pairs of welding rollers configured to weld together the opposite sides of the two sheets 21 which, two by two overlap each other, to the sides of the nozzle 11. In this case the first longitudinal welding means 27 make two first longitudinal welds 29 (FIG. 2 to 6) that form respective longitudinal edges 45 of the package B.

Or, in the case where the tubular casing 20 is defined by a single sheet 21 folded on itself, the first longitudinal welding means 27 comprise a single pair of welding rollers configured to weld together the sides of the same sheet 21 that overlap the side of the nozzle 11. In this case the first longitudinal welding means 27 only make a first longitudinal weld 29 (FIGS. 7 and 8) which forms the single longitudinal edge 45 of the package B.

Preferably, the first longitudinal welding means 27 are disposed upstream of the delivery outlet 16 of the second duct 13 with respect to the direction of advance indicated by the arrow F.

The first longitudinal welding means 27 are positioned at a first minimum distance D1 (FIGS. 2 and 4) from the longitudinal axis A.

Said first minimum distance D1 is intended to be measured perpendicularly with respect to said longitudinal axis A. In the case where the longitudinal axis A is substantially vertical the first minimum distance D1 is measured in a substantially horizontal direction.

In accordance with one aspect of the present invention, the machine further comprises second longitudinal welding means 31, disposed downstream of the first longitudinal welding means 27 with respect to the aforesaid direction of advance indicated by the arrow F. The second longitudinal welding means 31 are disposed in proximity to the delivery outlet 16 of the second duct 13, for example at approximately its same height, or even slightly below said delivery outlet 16. The second longitudinal welding means 31 are positioned at a second minimum distance D2 (FIGS. 2 and 5) from the longitudinal axis A.

Said second minimum distance D2 is intended to be measured perpendicularly to said longitudinal axis A. In the case where the longitudinal axis A is substantially vertical the second minimum distance D2 is measured in a substantially horizontal direction.

In the example provided herein with reference to FIGS. 2 to 6, the second longitudinal welding means 31 comprise two pairs of welding rollers configured to make second longitudinal welds 32, substantially continuous, which join two opposing portions of the internal surface 22 of the tubular casing 20.

Or, in the case where the tubular casing 20 is defined by a single sheet 21 folded on itself, like in the example of FIGS. 7 and 8, the second longitudinal welding means 31 comprise a single pair of welding rollers configured to make the single second longitudinal weld 32.

The conformation and the position of the second longitudinal welding means 31 may depend on the final shape to be given to the packages B and on the number of sheets 21 that are used to make them.

The arrangement of the second longitudinal welding means 31 allows forming second longitudinal welds 32 that join together the portions of the internal surface 22 of the tubular casing 20 that are immediately adjacent to the first longitudinal welds 29 made by the first longitudinal welding means 27.

In this way, the position of the second longitudinal welding means 31 is such as to ensure that each second longitudinal weld 32 is made at a respective marginal end volume V of said semi-closed chamber C adjacent to the first longitudinal weld 29.

Figure 5:
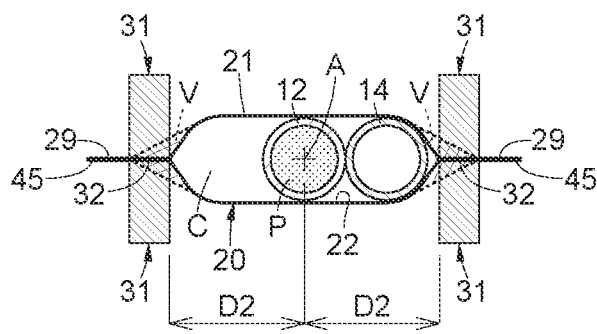

This marginal end volume V, indicated with inclined background in FIGS. 5, 7 and 8, is the portion of volume of the semi-closed chamber C that extends longitudinally throughout the package B in the zone of the chamber furthest away from the axis A and which, viewed in section, has a shape tapered towards the longitudinal edge 45.

Figure 4:
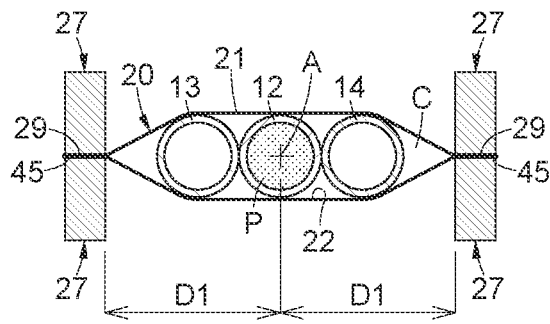
FIGS. 4, 5 and 6 are sectional views of FIG. 2 in accordance with plans IV-IV, V-V and VI-VI, respectively.

By way of example, see FIGS. 4 and 5 from which it is possible to see the reciprocal position between the first longitudinal welds 29 and the second longitudinal welds 32. The second longitudinal welds 32 are side by side to the first longitudinal welds 29 towards the inside of the tubular casing 20. In fact, the second longitudinal welds 32 are closer to the longitudinal axis A than the first longitudinal welds 29.

Advantageously, by doing so the second longitudinal welds 32 define a barrier interposed between the product P and the first longitudinal welds 29 made previously, preventing said portions of the internal surface 22 of the tubular casing 20 that are immediately adjacent to the first longitudinal welds 29 from coming into contact with the product P to be packaged into the packages B.

This eliminates, or at least reduces, the risk of bacterial proliferation within each package B that is potentially caused by a direct exposure of the product P on a non-decontaminated zone, for example located in the first longitudinal welds 29 or in their immediate vicinity.

Moreover, to achieve this advantageous technical effect also the arrangement of the second longitudinal welding means 31 in proximity to the delivery outlet 16 of the second duct 13, for example at approximately the same height, or even slightly below said outlet, is particularly advantageous to ensure that the second longitudinal welds 32 are made at a decontaminated zone of the internal surface 22. In fact, if the second longitudinal welding means 31 were disposed more upstream of the delivery outlet 16, the second longitudinal welds 32 would be made at points further away from the one of delivery of the sterilizing agent S and therefore there is a risk that they are made on portions of internal surface 22 that have not been decontaminated due to the fact that they have not been exposed to the sterilizing agent S for enough time since the sterilizing agent S which would instead be delivered more downstream than the point where the second welding means 31 are located.

Optionally, downstream of the second longitudinal welding means 31, the machine 10 also comprises cutting means 35 (FIGS. 1, 2, 6) preferably disposed at a third minimum distance D3 from the longitudinal axis A comprised between the second minimum distance D2 and the first minimum distance D1. Said third minimum distance D3 is also intended to be measured perpendicularly with respect to said longitudinal axis A. In the case where the longitudinal axis A is substantially vertical the third minimum distance D3 is measured in a substantially horizontal direction.

The cutting means 35 are configured to perforate the tubular casing 20 at a zone thereof compressed between the first 27 and the second longitudinal welds 32.

Figure 6:
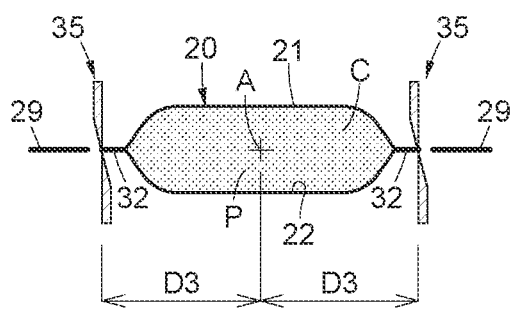

It should be specified that in the present description the term "perforate" can be understood both as the execution of holes on the sheet 21 that forms the tubular casing 20, as well as the execution of a neat and dividing cut on the sheet 21 that forms the tubular casing 20, as shown in FIG. 6, or also the execution of a scoring on the sheet 21 that forms the tubular casing 20.

By way of example, the cutting means 35 may comprise perforating elements configured to perforate the sheet 21 so as to eliminate any bubbles, chambers or micro air chambers possibly present between the first and second longitudinal welds 27, 32.

Or, alternatively, the cutting means 35 may comprise cutting elements configured to cut neatly or to score a portion of the sheet 21 comprised between the first and second longitudinal welds 29, 32.

Each nozzle 11 is also associated with transverse welding means 40 disposed downstream of the delivery outlets 15, 16, 17 of the ducts 12, 13, 14 and configured to make transverse welds 41 on the tubular casing 20.

Each transverse weld 41 joins two facing portions of the internal surface 22 of the tubular casing 20 along the transverse development thereof and develops by connecting the longitudinal sides of the tubular casing 20. In this way the transverse welds 41 define the transverse sides of the packages B.

In the example provided herein, the transverse welds 41 are made intermittently, in accordance with the advancement of the tubular casing 20 and with the desired longitudinal dimension for the packages B.

The operation of the machine 10 described so far, which corresponds to the method according to the present invention comprises the following steps.

It should be specified that in the description of the following method, first the steps that contribute to making the tubular casing 20 and subsequently the steps that provide for the delivery of the sterilizing agent S, of the product P and of the sterile gas G into the tubular casing 20 will be described. However, the person skilled in the art understands that the formation of the tubular casing 20 occurs substantially continuously and simultaneously with the steps that provide for the delivery of the sterilizing agent S, of the product P and of the sterile gas G.

The method provides a feed step in which the tubular casing 20 is made to advance with respect to the nozzle 11 and parallel to the longitudinal axis A.

In particular, the tubular casing 20 is made to advance towards the delivery outlets 15, 16, 17 of the ducts 12, 13, 14, along a direction of advance parallel to the longitudinal axis A and indicated by the arrow F.

In the example provided herein, the tubular casing 20 is made to advance from top to bottom.

It should be specified that, during the feed step, the feed means 19 give the desired tubular shape to the one or more sheets 21 so that it/they wrap(s) the nozzle 11 and define(s) the tubular casing 20.

The method also provides for a first longitudinal welding step in which the first longitudinal welding means 27 weld the one or more sheets 21 that wrap the nozzle 11 stabilizing the shape of the tubular casing 20.

In this step the first longitudinal welding means 27 make one or more first longitudinal welds 29, each of which defines a longitudinal side of the tubular casing 20.

For example, in the case where the tubular casing 20 is defined by two sheets 21 facing each other, the first longitudinal welding step provides for welding together the four sides of the two facing sheets 21 which, two by two, overlap the sides of the nozzle 11. In this case, the first longitudinal welding step provides for making two first longitudinal welds 29 (FIGS. 2 to 6).

Or, in the case where the tubular casing 20 is defined by a single sheet 21 folded on itself, the welding step provides for welding together the two longitudinal sides of the same sheet 21 folded on itself. In this case, the welding step provides for making a single first longitudinal weld 29 (FIGS. 7 and 8).

Preferably, the first longitudinal welds 29 are made continuously in accordance with the advancement of the sheet 21 with respect to the nozzle 11 along the longitudinal axis A and in the direction of advance indicated by the arrow F.

The method also provides for a second longitudinal welding step in which the second longitudinal welding means 31 weld at least two portions of said internal surface 22 of the tubular element defining at least a second longitudinal weld 32, side by side to a respective first longitudinal weld 29.

The portions of the internal surface 22 welded together during the second longitudinal welding step are preferably immediately adjacent to the first longitudinal welds 29 previously made by the first longitudinal welding step.

By way of example, see FIGS. 4 and 5 from which it is possible to see the reciprocal position between the first longitudinal welds 29 and the second longitudinal welds 32. The second longitudinal welds 32 are side by side to the first longitudinal welds 29 towards the inside of the tubular casing 20. In fact, the second longitudinal welds 32 are closer to the longitudinal axis A than the first longitudinal welds 29.

Advantageously, the second longitudinal welds 32 thus define a barrier between the product P and the first longitudinal welds 29, preventing said portions of the internal surface 22 of the tubular casing 20 that are immediately adjacent to the first longitudinal welds 29 from coming into contact with the product P to be packaged into the packages B.

In this way, the risk of bacterial proliferation within each package B is eliminated, or at least reduced, since possibly non-decontaminated portions of the package B, like for example the first longitudinal welds 29, and/or the zones of the internal surface 22 of the tubular casing 20 furthest away from the longitudinal axis A, are welded together and do not contact the product P.

In addition, the method also provides for a transverse welding step in which the transverse welding means 40 produce a plurality of transverse welds 41 that join two facing portions of the internal surface 22 of the tubular casing 20 along the transverse development thereof and develop by connecting the longitudinal sides of the tubular casing 20.

By virtue of this, in use, the tubular casing 20 that slides with respect to the nozzle 11 is closed laterally by the longitudinal welds 29, 32, made substantially continuously, and is closed at the bottom by the last transverse weld 41A made.

Furthermore, it should be noted that the tubular casing 20 therefore remains open at the top at an upper opening 43, thus defining the aforementioned semi-closed chamber C (FIGS. 2 and 3).

It should be noted that the same portion of tubular casing 20 that slides along the longitudinal axis A, during full operation of the machine 10, is first subjected to the first longitudinal welding step, then it is subjected to the second longitudinal welding step and subsequently it is subjected to the transverse welding step.

As the packages B continue their advancement along the direction of advance F, a subsequent transverse welding 41 operated by the transverse welding means 40 closes the package B at the top.

Optionally, the method also provides for a cutting step in which the tubular casing 20 is at least perforated in a zone comprised between a first longitudinal weld 29 and a second longitudinal weld 32.

In one example, the cutting step provides for drilling through holes in the sheet 21 so as to eliminate any chambers, micro-chambers or air bubbles that form between the first and second longitudinal welds 29, 32.

In another example, the cutting step provides for cutting neatly a portion of sheet 21 comprised between the first and second longitudinal welds 29, 32.

In a further example the cutting step provides for scoring a portion of the sheet 21 comprised between the first and second longitudinal welds 29, 32.

The method also provides for a sterilization step in which the second duct 13 delivers the sterilizing agent S into the tubular casing 20.

It should be noted that, from the point of view of a same portion of tubular casing 20 that slides along the longitudinal axis A, during full operation of the machine 10, the sterilization step occurs after the first longitudinal welding step and before the second longitudinal welding step.

This is a consequence of the reciprocal arrangement between the first and second longitudinal welding means 27, 31 and the delivery outlet 16 of the second duct 13.

The method also provides for a filling step in which the first duct 12 delivers the product P into the tubular casing 20, preferably above the last transversal weld made 41A.

It should be noted that, from the point of view of a same portion of tubular casing 20 that slides along the longitudinal axis A, during full operation of the machine 10, the filling step occurs after the second longitudinal welding step.

Advantageously, the second longitudinal welding step joins the portions of the internal surface 22 of the tubular casing 20 immediately adjacent to the first longitudinal welds 29. This allows to prevent portions of the internal surface 22 of the tubular casing 20 immediately adjacent the first longitudinal welds 29 from coming into contact with the product P to be packaged. In this way, the risk of bacterial proliferation within each package B is eliminated, or at least reduced.

The method also provides for a purging step in which the third duct 14 delivers a sterile gas G under pressure into the tubular casing 20.

The purging step has the function of purging a certain volume of sterilizing agent S from the lower portion of the tubular casing 20 so as to be able to deliver a dose of product P without the latter coming into contact with the sterilizing agent S.

In this way, during full operation of the machine 10, in an upper zone of the tubular casing 20 the sheet 21 advances contacting the sterilizing agent S while in a lower zone of the tubular casing 20 the sheet 21 advances contacting the sterile gas G.

Preferably, the filling step provides for delivering the product P precisely in the lower zone of the casing where in use the sheet 21 advances contacting the sterile gas G so that the product P does not come into contact with the sterilizing agent S.

Furthermore, in this way it is avoided trapping a volume of sterilizing agent S inside the packages B.

The person skilled in the art easily understands that the delivery of the product P, of the sterilizing agent S and of the sterile gas G can occur in any known manner, without thereby departing from the present invention.

By way of example only, in accordance with preferred embodiments, the delivery of the sterilizing agent S occurs continuously, in accordance with the advancement of the tubular casing 20. Furthermore, the delivery of the sterile gas G may occur intermittently, in accordance with the advancement of the tubular casing 20 and/or with the delivery of the sterilizing agent S.

In addition, in some embodiments the delivery of the product P may occur intermittently, in accordance with the manners of realization of the transverse welds 41. Or, in other embodiments, the delivery of the product P occurs continuously.

It is clear that modifications and/or additions of parts can be made to the machine 10 and to the method described above, without thereby departing the scope of the present invention as defined by the claims.

It is also clear that, although the present invention has been described with reference to some specific examples, a person skilled in the art will be able to make many other equivalent forms of machine and method for packaging a product into aseptic flexible packages, having the features expressed in the claims and therefore all of which falling within the scope of protection defined thereby. In the claims that follow, references in brackets are for ease of reading only and are not to be construed as limiting the scope of protection defined by the claims themselves.

The invention claimed is:

1. A machine for packaging in a sterile environment a product into flexible packages, wherein the machine comprises one or more forming and filling units for forming and filling said packages; wherein each of said forming and filling units extends along a longitudinal axis, wherein said forming and filling units comprises:

at least one nozzle provided with a first duct configured to deliver said product and a second duct configured to deliver a sterilizing agent, feed members configured to make one or more sheets advance in a direction of advance, parallel to said longitudinal axis, said one or more sheets defining a tubular casing around said nozzle which has an internal surface facing toward said nozzle and delimiting a semi-closed chamber, wherein said tubular casing is centered in said longitudinal axis, first longitudinal welding means configured to form at least a first longitudinal weld that joins said sheets at a respective longitudinal edge of said package, the machine comprising second longitudinal welding means, disposed downstream of said first longitudinal welding means with reference to said direction of advance, to make at least one second longitudinal weld that joins together at least two portions of said internal surface, wherein the position of said second longitudinal welding means is such that said second longitudinal weld is made at a respective marginal end volume of said semi-closed chamber adjacent to said first longitudinal weld so as to be closer to said center of the tubular casing with respect to the first longitudinal weld wherein said first longitudinal welding means are disposed at a first minimum distance from said center of the tubular casing which is greater than a second minimum distance at which said second longitudinal welding means are placed with respect to said center of the tubular casing, and wherein the machine also comprises cutting means disposed downstream of said second longitudinal welding means with reference to said direction of advance and configured at least to perforate said tubular casing at said marginal end volume, in an intermediate position between said first and second longitudinal weld.

2. The machine as in claim 1, wherein said cutting means are disposed at a relative minimum distance from said center of the tubular casing which is comprised between said first minimum distance and said second minimum distance.

3. The machine as in claim 1, wherein said first and second ducts have respective delivery outlets, and wherein said second longitudinal welding means are disposed in proximity to said delivery outlet of said second duct, approximately at the same height as said delivery outlet of said second duct, or slightly below said delivery outlet of said second duct.

4. The machine as in claim 3, wherein said delivery outlet of said second duct and said second longitudinal welding means are disposed upstream of said delivery outlet of said first duct with reference to said direction of advance.

5. The machine as in claim 3, wherein said nozzle also comprises a third duct configured to deliver at least one sterile gas and having a delivery outlet positioned downstream of said delivery outlet of said second duct with reference to said direction of advance.

6. The machine as in claim 5, wherein said delivery outlet of the third duct is positioned upstream of the delivery outlet of said first duct with reference to said direction of advance.

7. The machine as in claim 3, wherein said first longitudinal welding means are disposed upstream of said delivery outlet of said second duct.

8. The machine as in claim 1, wherein said first and second longitudinal welding means each comprise two pairs of welding rollers so as to make two longitudinal welds.

9. The machine as in claim 1, wherein said first and second longitudinal welding means each comprise a pair of welding rollers so as to make a single first longitudinal weld that forms the single longitudinal edge of said packages.

10. A method for packaging in a sterile environment a product into flexible packages in a machine which comprises one or more forming and filling units for forming and filling said packages, each of said forming and filling units extending along a longitudinal axis and comprising at least one nozzle, wherein said method comprises at least:

a feed step in which a tubular casing, made of a material suitable to produce said packages, having an internal surface facing toward said nozzle and delimiting a semi-closed chamber, is made to advance with respect to the nozzle and along the longitudinal axis;

a first longitudinal welding step in which said tubular casing is welded along at least one longitudinal side thereof to create at least a first longitudinal weld at a respective longitudinal edge of said package;

a sterilization step in which a second duct delivers a sterilizing agent inside said tubular casing, wherein said nozzle comprises said second duct;

the method also providing a second longitudinal welding step in which at least two portions of said internal surface are joined together by second longitudinal welding means to make at least one second longitudinal weld, wherein the position of said second longitudinal welding means is such as to ensure that said second longitudinal weld is made at a respective marginal end volume of said semi-closed chamber adjacent to said first longitudinal weld so as to be closer to said longitudinal axis with respect to the latter, and wherein the method also comprising a cutting step in which cutting means disposed downstream of said second longitudinal welding means perforate said tubular casing at said marginal end volume, in a zone comprised between said first longitudinal weld and said second longitudinal weld.

11. The method as in claim 10, wherein said sterilization step occurs after said first longitudinal welding step and prior to said second longitudinal welding step.

12. The method as in claim 10, also comprising:

a transverse welding step in which transverse welding means perform a transverse welding able to close a respective one of said packages at the bottom, a filling step in which a first duct delivers said product inside said tubular casing, wherein said nozzle comprises said first duct, wherein said filling step occurs after with respect to said second longitudinal welding and to said transverse welding step.

\* \* \* \* \*